United States Patent [19]

Moriyama et al.

[11] 3,839,075

[45] Oct. 1, 1974

[54] ADHESIVE TAPES AND A PROCESS FOR THE PREPARATION THEREOF

[75] Inventors: Yasuhiro Moriyama; Yasuo Mito, both of Fukaya; Minoru Takamizawa; Shiro Gomyo, both of Annaka, all of Japan

[73] Assignees: Nitto Electric Industrial Co. Ltd., Osaka-fu, Japan; Shinetsu Chemical Company, Tokyo, Japan

[22] Filed: Feb. 28, 1972

[21] Appl. No.: 229,748

[30] Foreign Application Priority Data
Mar. 4, 1971   Japan................................ 46-11658
Oct. 25, 1971  Japan................................ 46-84492

[52] U.S. Cl..... 117/76 A, 117/122 PF, 117/126 GB, 117/135.1, 117/138.8 N, 117/138.8 UF, 117/161 ZA
[51] Int. Cl. .............................................. C09j 7/02
[58] Field of Search......... 117/76 A, 122 P, 122 PF, 117/122 PA, 122 PS, 126 GB, 161 ZA

[56] References Cited
UNITED STATES PATENTS

| | | | |
|---|---|---|---|
| 2,732,318 | 1/1956 | Keil.................................... | 117/122 |
| 2,751,314 | 6/1956 | Keil.................................... | 117/122 X |
| 2,857,356 | 10/1958 | Goodwin.......................... | 117/122 X |
| 2,882,183 | 4/1959 | Bond et al. ......................... | 117/122 |
| 2,979,420 | 4/1961 | Harper............................. | 117/122 X |
| 2,989,419 | 6/1961 | Lamason........................... | 117/122 X |
| 3,032,438 | 5/1962 | Gaynes et al. .................... | 117/122 X |
| 3,202,535 | 8/1965 | Gaynes ............................ | 117/122 X |
| 3,406,820 | 10/1968 | Bond................................ | 117/122 X |
| 3,560,249 | 2/1971 | Chereshkevich et al. ....... | 117/126 X |

*Primary Examiner*—William D. Martin
*Assistant Examiner*—Bernard D. Pianalto
*Attorney, Agent, or Firm*—McGlew and Tuttle

[57] ABSTRACT

The adhesive tape of the invention has an adhesive layer of excellent anchoring strength to its backing and high adhesive strength. It is obtained by providing an under coat layer of organopolysiloxane composed of $SiO_2$, $R_3SiO_{0.5}$ and $R_2SiO$ units (wherein R represents a substituted or unsubstituted monovalent hydrocarbon radical) in which the whole organic groups comprise 0.2–10 molar percent of phenyl groups, 0.005–5 molar percent of vinyl groups and the remainder of substantially methyl group on the backing comprising a polyimide, polyamideimide or organic fluorine-containing polymer or metal foil and then placing thereon an adhesive layer comprising an organopolysiloxane.

6 Claims, 2 Drawing Figures

ADHESIVE TAPES AND A PROCESS FOR THE PREPARATION THEREOF

SUMMARY OF THE INVENTION

The present invention relates to an adhesive tape having distinguished adhesive characteristics and comprising an adhesive layer having an excellent property of anchoring to a backing to which it has been applied. The invention is also directed to a process for the preparation of the tape.

BACKGROUND OF THE INVENTION AND PRIOR ART

It is publicly known art that a pressuresensitive tape may be prepared by providing a silicone adhesive layer obtained by condensation of a copolymer composed of $SiO_2$ units and $(CH_3)_3SiO_{0.5}$ units with organopolysiloxane gum on a backing comprising polyimide, polyamideimide, an organic fluorine-containing polymer or metal foil. However, the tape thus prepared has such demerit that when it is used, for instance, for covering part of a rubber roll, its adhesive layer would be transferred to the surface to which it is applied and cause various troubles in its utility, since the adhesive layer itself has poor anchoring strength to the backing.

In order to increase the anchoring strength of such an adhesive tape, there have been proposed some known methods, for example, a method in which the surface of the backing is previously treated chemically with ammonium complex of sodium or naphthalene solution of sodium in case the backing comprises an organic fluorinecontaining polymer, and a method in which the surface of the backing is generally subjected to physical abrasion treatment before it is applied with a silicone adhesive. However, the transference of the adhesive layer to the surface to which the tape is applied cannot be eliminated sufficiently even by any of those methods. The demerit of the transference is particularly remarkable in case the tape is applied to a silicone rubber roll or the like.

OBJECTS OF THE INVENTION

An object of the present invention is to provide an adhesive tape of high adhesive strength to various surfaces, in which the adhesive layer has an excellent property of anchoring to its backing. Another object of the present invention is to provide an adhesive tape which adheres by pressure firmly to the surfaces of various materials such as silicone rubber, neoprene rubber, acrylic resin, glass and metal, and when peeled, does not leave its adhesive layer on said surfaces but separates them entirely therefom. Still another object of the invention is to provide a process suitable for preparing an adhesive tape having the above-described characteristics.

DESCRIPTION OF THE INVENTION

The adhesive tape according to the present invention is prepared by providing an under-coat layer of organopolysiloxane (A) containing 0.2–10 molar percent, based on the whole organic groups, of phenyl group, 0.005–5 molar percent of vinyl group and the remainder of substantially methyl group on a backing which comprises polyimide, polyamideimide or an organic fluorine-containing polymer or metal foil at least at its surface and then forming thereon an adhesive layer comprising a conventional organopolysiloxane (B), the organopolysiloxane (A) being obtained by partial condensation reactions of 30–70 parts by weight of a copolymer (a) composed of $SiO_2$ units and $R_3SiO_{0.5}$ units (wherein R represents a substituted or unsubstituted monovalent hydrocarbon group such as methyl, ethyl, trifluoropropyl, phenyl or vinyl group) in a molar ratio of from 1:0.4 to 1:1 with 70–30 parts by weight of a diorganopolysiloxane (b) composed of $R'_2SiO$ units (wherein R' represents a substituted or unsubstituted monovalent hydrocarbon group), containing hydroxyl or vinyl groups at the end of its molecular chain, and having a viscosity of more than 100,000 centistokes at 25°C. The adhesive tape of the invention has the advantage that it has high adhesive strength to various surfaces and quite excellent anchoring strength to its backing.

The organopolysiloxane (A) containing the specified amounts of phenyl and vinyl groups may be obtained by mixing under heating 30–70 parts by weight, preferably 40–60 parts by weight, of a copolymer (a) composed of $SiO_2$ units (Q units) and $R_2SiO_{0.5}$ units (M units) in which the whole organic group R is a methyl group or a part thereof is replaced with a vinyl or a phenyl group, the two units being in a molar ratio of from 1:0.4 to 1:1, preferably from 1:0.5 to 1:0.8, with 70–30 parts by weight, preferably 60–40 parts by weight, of a diorganopolysiloxane (b) of a viscosity of 100,000 centistokes (at 25°C) or more, containing hydroxyl or vinyl groups at the end of the molecular chain and a vinyl or a phenyl group in its main chain if necessary, to effect partial condensation reactions. The organopolysiloxane thus obtained has remarkable adhesive strength.

The reason for the limiting molar ratio of the Q units to the M units in the range of from 1:0.4 to 1:1 is that, if the ratio is below 1:0.4, the resulting copolymer (a) would become hard and, on the other hand, if the ratio is above 1:1, it would become oily. Thus, in both cases, adhesive organopolysiloxane (A) cannot be obtained. In the condensation of the copolymer (a) with the diorganopolysiloxane (b), their amounts should be 30–70 parts and 70–30 parts by weight, respectively, in order to obtain the organopolysiloxane (A) of high adhesive strength.

In the organopolysiloxane (A), if the proportion of phenyl and vinyl groups to the whole of the organic groups is too small, the aimed improvement in anchoring strength cannot be attained and, on the other hand, if it is too large, firm adhesion (solidification) between the under coat layer of the organopolysiloxane (A) and the adhesive layer of the organopolysiloxane (B) applied thereon cannot be attained. In the latter case, the two layers sometimes separate from each other, or the adhesive layer in its entirety becomes turbid to reduce its commercial value. Accordingly, the proportions of phenyl and vinyl groups in the whole organic groups should be 0.2–10 molar percent, preferably 1–7 molar percent and 0.005–5 molar percent, preferably 0.1–2 molar percent, respectively. The remainder of the organic groups should be the methyl group, but may contain a small amount of a substituted or unsubstituted monovalent hydrocarbon group such as the trifluoropropyl or the ethyl group.

The adhesives of organopolysiloxane (B) used in the invention are known ones, such as an adhesive comprising an organopolysiloxane obtained by condensation reaction of 30–70 parts by weight of a copolymer (c) of $SiO_2$ units and $(CH_3)_3SiO_{0.5}$ units in molar ratio of from 1:0.4 to 1:1 and 70–30 parts by weight of dimethylpolysiloxane gum (d) or an organopolysiloxane in which part of the dimethylpolysiloxane gum (d) contains phenyl groups. They are disclosed in the specifications of Japanese Patent Publication No. 5186/1955 and U.S. Pat. No. 2,857,356. As commercial product, for example, KR-101 of Shinetsu Chemical Company and DC-280 of Dow Corning Corporation are available.

Backing to which the adhesive layer is applied, may be made from polyimides; polyamideimides; organic fluorine-containing polymers such as polytetrafluoroethylene, polytrifluoromonochloroethylene and copolymer of tetrafluoroethylene-hexafluoropropylene; polyvinylfluoride; polyfluorovinyliden; copolymer of tetrafluoroethyleneethylene; glass fiber tapes and sheets coated with said polyimide, polyamideimides, organic fluorine-containing polymers; and foils of inorganic materials such as metals, for example, aluminum, lead, platinum, gold and tin. As the polyimides, there may be used publicly known polyimides shown in the specifications of, for example, U.S. Pat. No. 3,176,630 and British Pat. No. 903,271. As the polyamideimides, there may be used publicly known ones shown in the specifications of, for example, U.S. Pat. Nos. 3,260,691 and 3,347,828 and British Pat. No. 1,056,564.

In the preparation of an adhesive tape according to the present invention, an under coat layer of an organopolysiloxane containing the above suggested amounts of phenyl and vinyl groups is formed first on the surface of the backing. Before this, the surface of the backing is preferably subjected to the chemical or physical treatment as previously described. The application of the organopolysiloxane to the backing can be facilitated by diluting it previously with an organic solvent sbch as benzene, toluene, xylene, trichloroethylene or perchloroethylene. It is preferred to blend previously about 0–10 percent by weight of a curing catalyst such as benzoyl peroxide, dicumyl peroxide or ditert.-butyl peroxide with the organopolysiloxane in order to harden it completely after the application. Drying after the application may be effected by merely air-drying but drying under heating at about 80°–160°C is preferred.

Over the layer of the organopolysiloxane (A) thus obtained a solution of the organopolysiloxane is then applied (B) in an organic solvent in a proper manner to form an adhesive layer on the backing. For facilitating the formation of the adhesive layer, it is necessary that the same curing catalyst, viz., benzoyl peroxide, dicumyl peroxide or di-tert.-butyl peroxide is blended with the coating liquid and also that after the application, the adhesive layer is dried under heating at a temperature of about 100°–200°C.

The amount of the organopolysiloxane (A) to be applied to the backing according to the invention should be at the rate of at least 0.02 g/m², preferably at least 0.2 g/m², while that of the adhesive organopolysiloxane (B) should be such that the organopolysiloxane (A) applied is within the range of from 0.0005 to 1, preferably from 0.005 to 0.5, part by weight per part by weight of the organopolysiloxane (B).

DESCRIPTION OF THE DRAWINGS

The adhesive tapes of the present invention will be illustrated with reference to the accompanying drawings.

Figure 1:
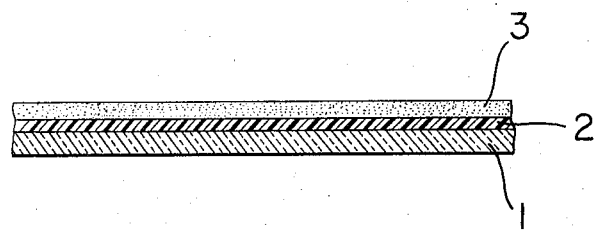
FIGS. 1 and 2 show partial sections of the adhesive tape.
Figure 2:
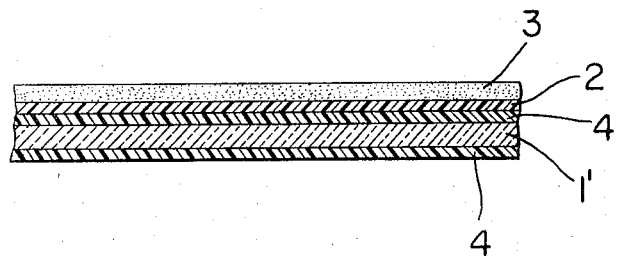

Adhesive tape shown in FIG. 1 comprises a backing 1, an under coat layer 2 of organopolysiloxane (A) and an adhesive layer 3 of organopolysiloxane (B). Adhesive tape shown in FIG. 2 comprises a glass fiber tape 1' coated with a surface coating agent such as polyimide, polyamideimide or organic fluorine-containing polymer, a layer 2 of organopolysiloxane (A) and an adhesive layer 3 of organopolysiloxane (B).

The adhesive tapes obtained by the process of the present invention have a merit that, since organopolysiloxane (A) exhibits an excellent priming effect on the adhesive layer of organopolysiloxane (B), the anchoring strength of the adhesive layer to the backing is superior and, therefore, undesirable tear between the layers is not caused. Another merit of the adhesive tapes is that they have quite high strength of adhesion to the surfaces of various materials and they can be peeled completely from the surfaces without transference of the adhesive layer to the surfaces.

DESCRIPTION OF SPECIFIC EMBODIMENTS

The process of the present invention will be illustrated by way of the following Examples, in which parts are all by weight.

EXAMPLE 1

One side of a polytetrafluoroethylene tape of 0.05 mm thickness was treated with a solution of metallic sodium in liquid ammonia. The surface was then coated with coating solution I of a composition described below, air-dried and heat-treated at 120°C for 10 minutes to form 2.0 g/m² of an under coat layer. The layer was coated with coating solution II of a composition also described below, air-dried and heat-treated at 150°C for 15 minutes to form an adhesive layer of 0.03–0.04 mm thickness. Properties of the adhesive tape are as shown in Table 1.

In Comparative Example 1 in the Table, coating solution I was not used. In Comparative Example 2, coating solution II was not used but coating solution I was applied to form a layer of about 0.04 mm thickness. Data of Comparative Examples 1 and 2 are also shown in the Table. The data in Table 1 suggest that the adhesive tape prepared according to the process of the invention has excellent adhesive strength and that the adhesive layer of the tape is not transferred to surfaces and, accordingly, high workability of the tape is confirmed.

Coating solution I: Mixed solution comprising (1) 100 parts of 60 percent solution in xylene of organopolysiloxane containing 5 molar percent of phenyl group, 0.3 molar percent of vinyl group, based on the whole organic groups and the remainder of methyl group, (2) 1.2 parts of benzoyl peroxide and (3) 200 parts of toluene, the organopolysiloxane being obtained by condensation reaction of 50 parts of a siloxane copolymer composed of $R_3SiO_{0.5}$ and $SiO_2$ units (molar ratio 0.7:1) with 50 parts of gum-like diorganopolysiloxane represented by the unit formula $R_2SiO$.

Coating solution II: Mixed solution comprising (1) 100 parts of 60 percent solution in xylene of an organopolysiloxane adhesive composition obtained by condensation reaction of 55 parts of siloxane resin composed of $(CH_3)_3SiO_{0.5}$ units and $SiO_2$ units (molar ratio 0.75:1) with 45 parts of gum-like dimethylpolysiloxane, (2) 1.2 parts of benzoyl peroxide and (3) 100 parts of toluene.

ane resin composed of $R_3SiO_{0.5}$ and $SiO_2$ unit (molar ratio 0.5:1) with 60 parts of gum-like diorganopolysiloxane.

Coating solution III thus obtained was then applied to

Table 1

|  |  | Present Invention | Comparative Example 1 | Comparative Example 2 |
|---|---|---|---|---|
| Quantity of coating solution I (g/m² or film thickness) | | 2.0 g/m² | — | 0.04 mm |
| Quantity of coating solution II (film thickness; mm) | | 0.04 | 0.03 | — |
| Adhesive tape | Tensile strength (kg/25mm width) | 12.9 | 12.9 | 12.8 |
| | Elongation (%) | 90 | 90 | 90 |
| 180° peel adhesion strength (g/25mm width) | to stainless steel plate | 720 | 660 | 450 |
| | to own backing | 310 | 330 | 180 |
| Unwind force (g/25mm width) | | 470 | 430 | 510 |
| Transference of adhesive layer to own backing | | o | o | o |
| Transfer of adhesive layer to the surface of subject | | | | |
| Storage at 50°C for 3 days after application | Silicone rubber (* note) | o | x | Δ |
| | Neoprene rubber | o | x | Δ |
| | Melamine decorative Sheet | o | x | x |
| | Acrylic plate | o | x | x |
| | Glass plate | o | x | x |
| | Stainless steel plate | o | x | x |
| Storage at 200° for 5 hours after application | Stainless steel plate | o | x | x |

(* Note) : Thermosetting silicone rubber
o : Transference was not recognized.
Δ : Partial transference was recognized.
x : Transference was observed: inferior.

EXAMPLE 2

Coating solution III was prepared by mixing 100 parts of 60 percent solution in xylene of organopolysiloxane containing 2 molar percent, based on the whole organic groups, of phenyl group, 1.2 molar percent of vinyl group and the remainder of methyl group and 2.5 parts of benzoyl peroxide, said organopolysiloxane being obtained by the condensation reaction of 40 parts of siloxthe same surface-treated polytetrafluoroethylene tape as in Example 1 in various quantities as shown in Table 2. The surface was then coated with the same coating solution II as in Example 1 to form adhesive layer. Properties of thus obtained adhesive tapes were as shown in Table 2. Data of Comparative Example 3 in the Table are those obtained by using coating solution II in place of coating solution III in the formation of adhesive layer.

Table 2

|  |  | Comparative Example 3 | Present invention | Present invention | Present invention |
|---|---|---|---|---|---|
| Quantity of coating solution III (g/m²) | | — | 0.02 | 0.2 | 2.0 |
| Quantity of coating solution II (film thickness; mm) | | 0.04 | 0.04 | 0.04 | 0.04 |
| Adhesive tape | Tensile strength (kg/25 mm width) | 12.8 | 12.9 | 12.9 | 12.9 |
| | Elongation (%) | 90 | 85 | 90 | 90 |
| 180° peel adhesion strength (g/25 mm width) | to stainless steel plate | 690 | 710 | 710 | 720 |
| | to own backing | 320 | 300 | 290 | 310 |

Table 2—Continued

|  |  | Comparative Example 3 | Present invention | Present invention | Present invention |
|---|---|---|---|---|---|
| Unwind force (g/25 mm width) | | 460 | 460 | 450 | 470 |
| Transference of adhesive layer to own backing | | Δ | o | o | o |
| Transference of adhesive layer to the surface of subject | | | | | |
| Storage at 50°C for | Silicone rubber A | x | Δ | Δ | o |
| 3 days after application | Silicone rubber B | x | Δ | Δ | o |
| | Neoprene rubber | x | Δ | Δ | o |
| Storage under 60g/cm² | Silicone rubber B | x | x | Δ | Δ |
| at 50°C for 3 days | Neoprene rubber | x | x | Δ | o |
| | Pressure (20g/cm²): | | | | |
| | Silicone rubber A | x | x | x | Δ |
| Storage at 200°C for | Silicone rubber B | x | x | x | Δ |
| one hour | Pressure (40g/cm²): | | | | |
| | Silicon rubber A | x | x | x | Δ |
| | Silicone rubber B | x | x | Δ | o |

Silicone rubber A: Silicone rubber which hardens at room temperature.
Silicon rubber B: Silicone rubber which hardens by heating.

EXAMPLE 3

Coating solution IV was preprared by mixing 100 parts of 60 percent solution in xylene of organopolysiloxane containing 5 molar percent, based on the whole organic group, of phenyl group, 0.3 molar percent of vinyl group and the remainder of methyl group, and 200 parts of toluene, said organopolysiloxane being obtained by the condensation reaction of 50 parts of siloxane resin composed of $R_3SiO_{0.5}$ units and $SiO_2$ units (molar ratio 0.7:1) with 60 parts of gum-like diorganopolysiloxane.

Coating solution IV thus obtained was then applied to a glass fiber tape coated with polytetrafluoroethylene dispersion (the surface of which had been treated previously with ammonium complex of sodium) in nearly the same quantity as in Example 1. The surface was further coated with coating solution II' shown below to form adhesive layer of 0.03–0.04 mm thick. Properties of thus obtained adhesive tape were as shown in Table 3.

Data of Comparative Example 4 in the Table are those obtained by applying coating solution II' in place of coating solution IV to the glass fiber tape in the formation of adhesive layer.

Coating solution II': Mixed solution comprising (1) 100 parts of 60 percent solution in xylene of organopolysiloxane adhesive composition obtained by the condensation reaction of 45 parts of siloxane resin composed of $(CH_3)_3SiO_{0.5}$ units and $SiO_2$ units (molar ratio 0.65:1) with 55 parts of gum-like dimethylpolysiloxane, (2) 1.2 parts of benzoyl peroxide and (3) 100 parts of toluene.

Table 3

|  |  |  | Present Invention | Comparative Example 4 |
|---|---|---|---|---|
| Tape thickness (mm) | | | 0.12 | 0.12 |
| Adhesive tape | Tensile strength (kg/25 mm width) | | 28.4 | 28.8 |
| | Elongation (%) | | 3 | 4 |
| 180° peel adhesion strength (g/25 mm width) | to stainless steel plate | | 600 | 580 |
| | to own backing | | 510 | 520 |
| Unwind force (g/25 mm width) | | | 550 | 530 |
| Transference of adhesive layer to own backing | | | o | o |
| Transference of adhesive layer to the surface of subject | | | | |
| Storage at 50°C for 3 days after application | | Silicone rubber (Note*) | o | x |
| | | Neoprene rubber | o | x |
| | | Melamine plate | o | o |
| | | Glass plate | o | o |
| | | Acrylic plate | o | x |
| | | Stainless steel plate | 0 | x |
| Storage at 200°C for 5 hours after application | | Stainless steel plate | o | x |

(Note *): Thermosetting silicone rubber

EXAMPLE 4

Coating solution I used in Example 1 was applied to one side of a polyimide film (Kapton Film, a product of du Pont) of 0.025 mm thick and then dried to form an under coat layer of 4 g/m². Thereafter, the coating solution II was applied onto the layer to form an adhesive layer of 0.03–0.04 mm thick. The properties of the adhesive tape thus obtained are as shown in Table 4.

Data of Comparative Example 4 in the Table were obtained in the absence of coating solution I. From the data, it is confirmed that the adhesive tape obtained according to the process of the invention has high adhesive strength and that it is free from transference of the adhesive layer to the surface to which it is applied and, therefore, its workability is excellent.

EXAMPLE 5

Coating solution I used in Example 1 was applied to one side of a polyamideimide film (TH-1000 50 film, a product of Toray Co.) of 0.05 mm thick and then dried to form an under coat layer of 2 g/m². Thereafter, coating solution II' used in Example 3 was applied onto the layer to form an adhesive layer of 0.03–0.04 mm thick. Properties of the adhesive tape are as shown in Table 5.

Data of Comparative Example 5 in the Table were obtained by applying coating solution II' in place of coating solution I in the formation of the adhesive layer.

Table 4

|  |  | Present invention | Comparative Example 4 |
|---|---|---|---|
| Quantity of coating solution I (g/m²) | | 4.0 | — |
| Quantity of coating solution II (film thickness; mm) | | 0.03 | 0.03 |
| Adhesive tape | Tensile strength (kg/25 mm width) | 5.6 | 5.8 |
|  | Elongation | 70 | 70 |
| 180° peel adhesion strength (g/25 mm width) | to stainless steel plate | 650 | 630 |
|  | to own backing | 620 | 610 |
| Transference of adhesive layer to own backing | | o | o |
| Transference of adhesive layer to the surface of subject | | | |
| Storage at 50°C for 3 days after application | Silicon rubber plate (Note *) | o | x |
|  | Neoprene rubber plate | o | x |
|  | Melamine decorative sheet | o | Δ |
|  | Copper plate | o | Δ |
|  | Stainless steel plate | o | Δ |
| Storage at 200°C for 8 hours after application | Stainless steel plate | o | x |
|  | Copper plate | o | Δ |

(Note *) : Thermosetting silicone rubber.
o : Transference was not observed.
Δ : Partial transference was observed.
x : Transference was observed: inferior.

Table 5

|  |  | Present Invention | Comparative Example 5 |
|---|---|---|---|
| Quantity of coating solution I (g/m²) | | 2.0 | — |
| Quantity of coating solution II' (film thickness; mm) | | 0.03 | 0.03 |
| Adhesive tape | Tensile strength (kg/25 mm width) | 10.9 | 10.8 |
|  | Elongation (%) | 38 | 35 |
| 180° peel adhesion strength (g/25 mm width) | to stainless steel plate | 680 | 660 |
|  | to own backing | 730 | 700 |
| Transference of adhesive layer to own backing | | o | o |
| Transfer of the adhesive layer to the surface of subject | | | |
| Storage at 50°C for 3 days after application | Silicone rubber plate | Δ | x |
|  | Stainless steel plate | o | o |
|  | Neoprene plate | o | x |
|  | Copper plate | o | Δ |
| Storage at 200°C for 8 hours after application | Stainless steel plate | o | Δ |
|  | Copper plate | o | Δ |

EXAMPLE 6

Coating solution V of a composition shown below was applied to one side of a soft aluminum foil of 0.08 mm thick which had been polished by sand blast treatment. Thus obtained layer was then dried to form an under coat layer of 4 g/m². Thereafter, coating solution II used in Example 1 was applied onto the layer to form an adhesive layer of 0.04 mm thick. Properties of the adhesive tape thus obtained are as shown in Table 6.

Data of Comparative Example 6 in the Table were obtained by applying coating solution II in place of coating solution V in the formation of the adhesive layer.

Coating solution V: Mixed solution comprising (1) 100 parts of 60 percent solution in xylene of organopolysiloxane containing 3 molar percent, based on the whole organic groups, of phenyl group, 1.2 molar percent of vinyl group and the remainder of methyl group, (2) 1.2 parts of benzoyl peroxide and (3) 200 parts of toluene, the organopolysiloxane being obtained by condensation reaction of 45 parts of siloxane resin composed of $R_3SiO_{0.5}$ units and $SiO_2$ units (molar ratio 0.6:1) with 55 parts of gum-like diorganopolysiloxane represented by the unit formula $R_2SiO$.

Table 6

|  | Present Invention | Comparative Example 6 |
|---|---|---|
| Quantity of coating solution V (g/m²) | 4.0 | — |
| Quantity of coating solution II (film thickness; mm) | 0.04 | 0.04 |
| Adhesive tape { Tensile strength (kg/25 mm width) | 10.4 | 10.6 |
| Adhesive tape { Elongation (%) | 7 | 9 |
| Transference of adhesive layer to own backing | o | x |
| Transference of adhesive layer to the surface of substrate | | |
| Storage at 50°C for 3 days after application — Silicone rubber plate | Δ | x |
| Neoprene rubber plate | Δ | x |
| Stainless steel plate | o | x |
| Copper plate | o | x |
| Storage at 200°C for 8 hours after application — Stainless steel plate | | x |
| Copper plate | Δ | x |

What is claimed is:

1. Adhesive tape which comprises (1) an undercoat layer of organopolysiloxane (A) containing 0.2–10 molar percent of the phenyl group, 0.005–5 molar percent of the vinyl group, the molar percentages being based on the whole of the organic groups, and the remainder of said groups being substantially the methyl group, said undercoat layer being coated on a backing which comprises a member selected from polyamide, polyamide-imide, and organic fluorine-containing polymer, and metal foil at least at the surface of said backing, and (2) an adhesive layer placed on said undercoat layer comprising organopolysiloxane (B), said organopolysiloxane (A) being obtained by partial condensation of 30–70 parts by weight of a copolymer (a) composed of $SiO_2$ and $R_3SiO_{0.5}$ units, wherein R is selected from substituted and unsubstituted monovalent hydrocarbon groups, in a molar ratio of from 1:0.4 to 1:1 with 70–30 parts by weight of a diorganopolysiloxane (b) composed of $R'_2SiO$ units, wherein R' is selected from substituted and unsubstituted monovalent hydrocarbon groups, said units containing a member selected from the group consisting of hydroxyl and vinyl at the end of the unit's molecular chain, and having a viscosity of more than 100,000 centistokes at 25°C.

2. The adhesive tape according to claim 1, in which said organopolysiloxane (B) comprises the partial condensation product of 30–70 parts by weight of a copolymer (c) composed of $SiO_2$ and $(CH_3)SiO_{0.5}$ units in a molar ratio of from 1:0.4 to 1:1 with 70–30 parts by weight of dimethylpolysiloxane gum (d).

3. The adhesive tape according to claim 1, in which said copolymer (a) is composed of $SiO_2$ and $R_3SiO_{0.5}$ units in a molar ratio of from 1:0.5 to 1:0.8.

4. The adhesive tape according to claim 1, in which said organopolysiloxane (A) contains 1–7 molar percent of phenyl groups and 0.1–2 molar % of vinyl groups, based on the whole of said organic groups.

5. The adhesive tape according to claim 1, in which said backing is composed of glass fiber tape the surface of which is coated with a member selected from the group consisting of polyamide, polyamideimide, and organic fluorinecontaining polymer.

6. The adhesive tape according to claim 1, in which said organic fluorine-containing polymer is selected from the group consisting of poly-tetrafluoroethylene, polytetrafluoromonochloroethylene and copolymer of tetrafluoroethylene and hexafluoropropylene.

* * * * *